United States Patent [19]

Chavira

[11] Patent Number: 4,570,962
[45] Date of Patent: Feb. 18, 1986

[54] RETRACTABLE VEHICLE STEP ASSEMBLY

[76] Inventor: Salvador V. Chavira, 1330 N. Alma Ave., Los Angeles, Calif. 90063

[21] Appl. No.: 570,956

[22] Filed: Jan. 16, 1984

[51] Int. Cl.[4] .............................................. B60R 3/02
[52] U.S. Cl. .................................... 280/166; 105/447; 182/91
[58] Field of Search ............ 280/166, 164 R; 182/91, 182/97, 127; 49/70; 105/443, 447

[56] References Cited

U.S. PATENT DOCUMENTS

| | | | |
|---|---|---|---|
| 1,428,030 | 9/1922 | Heaton | 280/166 |
| 2,263,782 | 11/1941 | Landsberg et al. | 280/166 |
| 3,561,786 | 2/1971 | Lentz | 182/91 |
| 3,671,058 | 6/1972 | Kent | 280/166 |
| 3,807,758 | 4/1974 | Rogge | 280/166 |

Primary Examiner—Joseph F. Peters, Jr.
Assistant Examiner—Mark C. Dukes
Attorney, Agent, or Firm—Harlan P. Huebner

[57] ABSTRACT

A retractable vehicle step assembly suited for recreational vehicles secured to the under-frame of a vehicle below an access door. The assembly includes a frame and a pivotally mounted step associated with the frame for movement from a first retracted position under the vehicle to a second extended position to act as a step into and out of the vehicle. The step is attached to the door by linkage so that the pivoting of the step corresponds to the opening or closing of the door.

6 Claims, 9 Drawing Figures

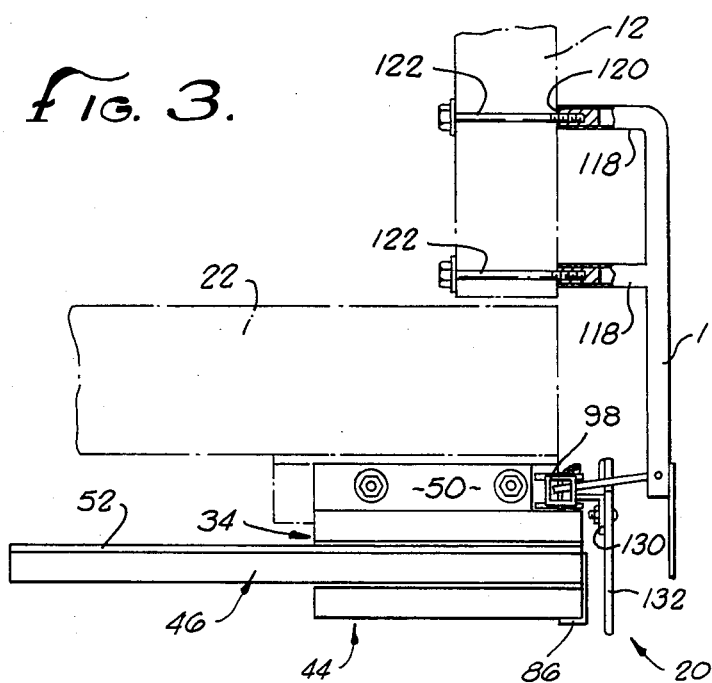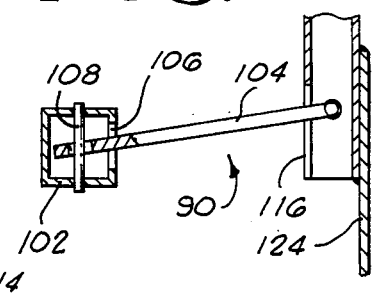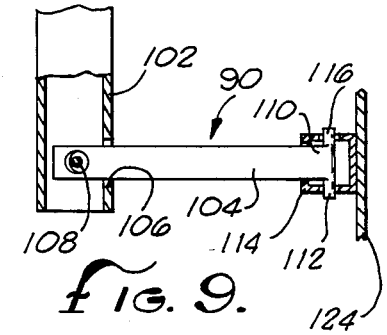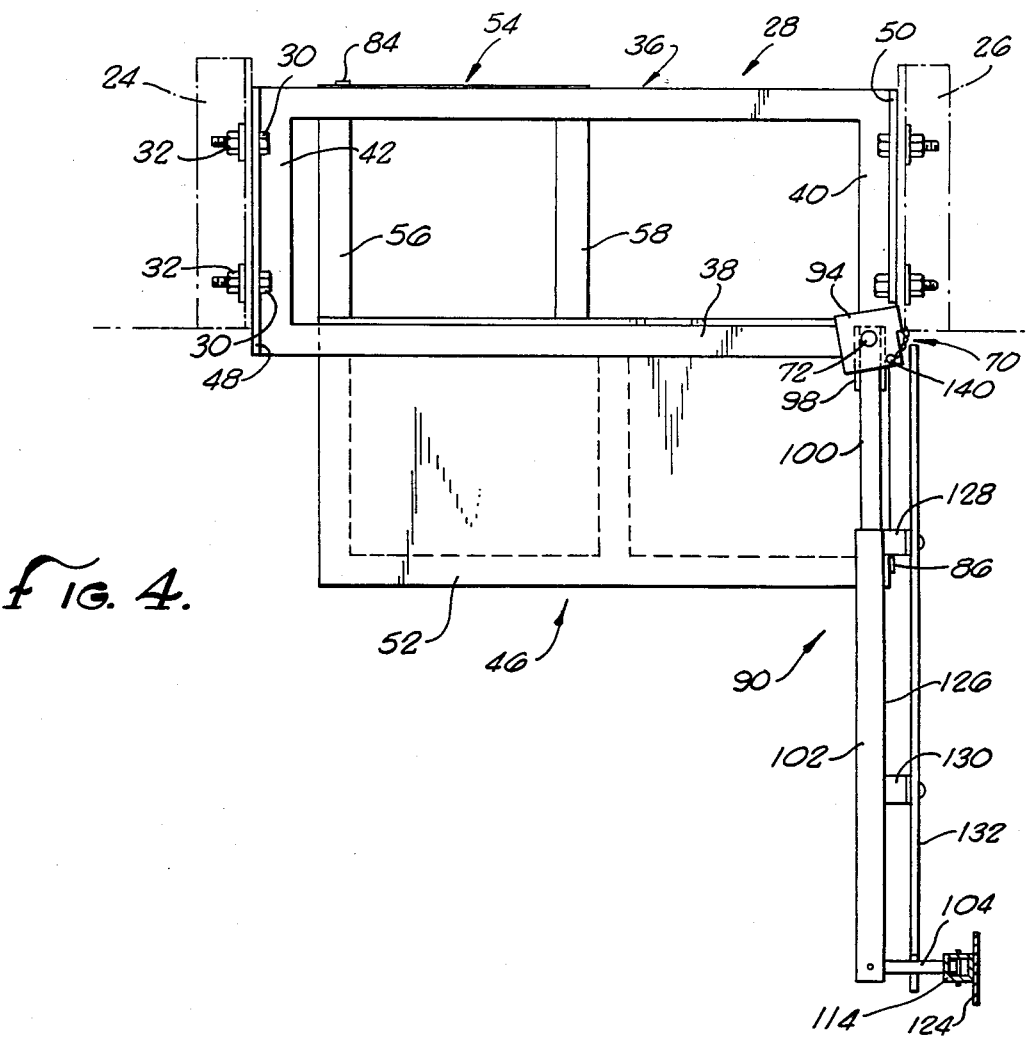

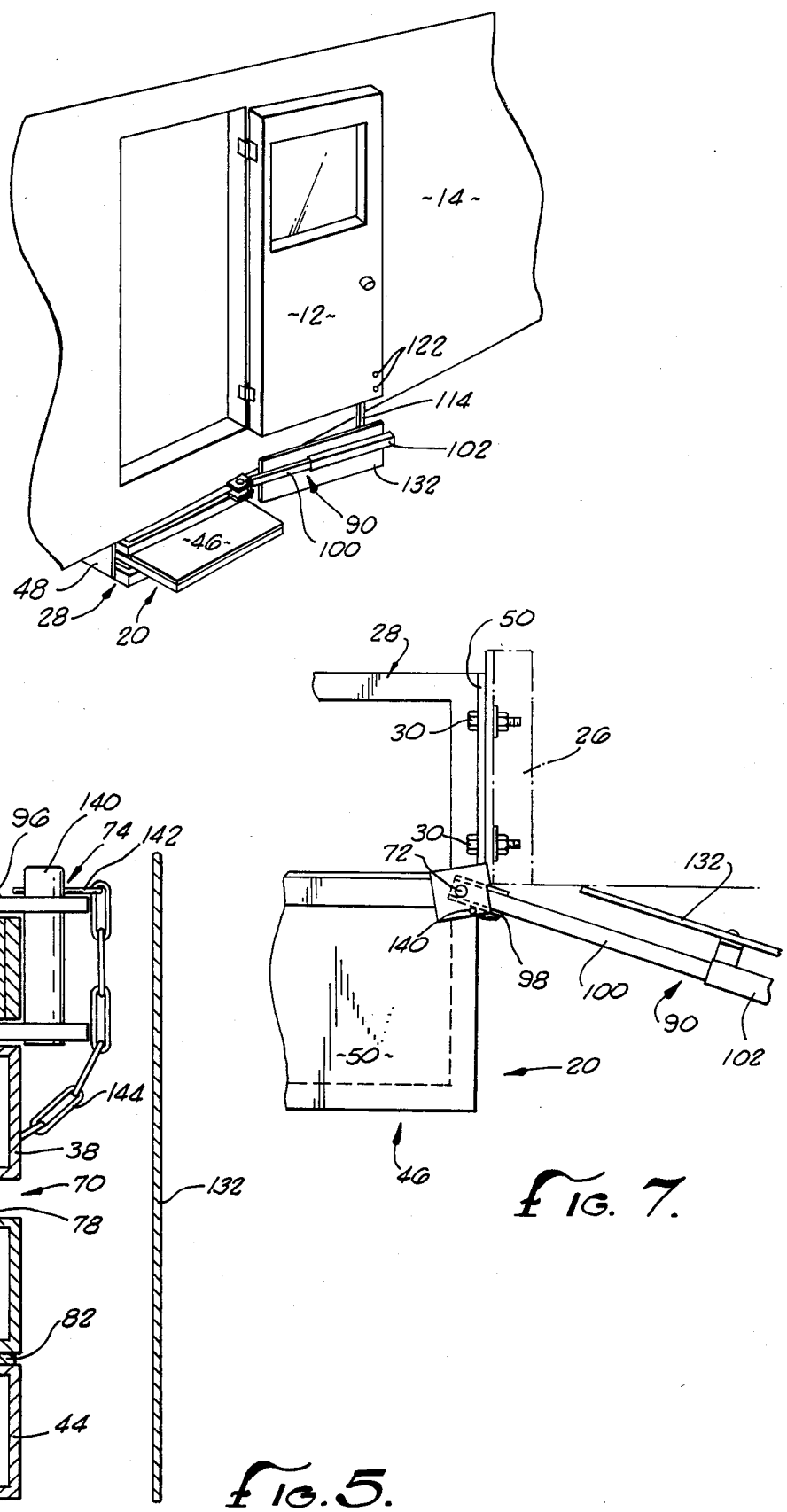

4,570,962

RETRACTABLE VEHICLE STEP ASSEMBLY

BACKGROUND OF THE INVENTION

In motor homes, vans, trailers, etc. the door entry is usually elevated above the ground a greater distance than a conventional step. There have been many types of steps used to facilitate entry.

Some of the prior art includes fold out steps that are hinged to the vehicle in the door opening and when the door is open the hinged steps may be pivoted outwardly and downward to cover the distance to the ground. In addition portable steps have been provided whereby they are placed on the ground in front of the door opening. In each of the prior art steps they are bulky requiring storage inside the vehicle when not in use. Such storage will takeup critical space needed for living inside the vehicle.

SUMMARY OF THE INVENTION

It is a purpose of the present invention to provide a retractable vehicle step assembly for vans and recreational vehicles which is mounted below the body of the vehicle and will pivot outwardly of the vehicle when the vehicle door is opened.

Another object is to provide a retractable vehicle step which is connected to a vehicle door so that upon opening or closing of the door the step will extend out or retract under the vehicle.

A still further object is to provide a retractable vehicle step which includes various stop means to prevent the step portion from extending or retracting beyond certain prescribed limits.

Another object of the present invention is to provide lock means to limit the outward movement of the vehicle door relative to the retractable vehicle step.

A still further object of the present invention is to provide a retractable vehicle step which is constructed to utilize existing hardware on the undercarriage of a mobile home for fixing the same to the vehicle.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIG. 3 is an end elevational view of a portion of the retractable vehicle step and vehicle door taken on line 3—3 of FIG. 1;

FIG. 4 is a top elevational view of the retractable vehicle step similar to FIG. 2 with the step extending outward of the vehicle and the vehicle door in a partial open position;

FIG. 5 is an enlarged sectional detail view of locking means for retaining a vehicle door in a partial or fully open position;

FIG. 6 is a perspective view of a portion of the recreational vehicle with the door thereof and retractable vehicle step in fully open and extended positions;

FIG. 7 is a top view of details of the locking means;

FIG. 8 is a cross sectional view of the means uniting the retractable vehicle step and vehicle door; and FIG. 9 is top elevational view of the tie means of FIG. 8.

DETAILED DESCRIPTION OF THE PREFERRED EMBODIMENT

Figure 1:
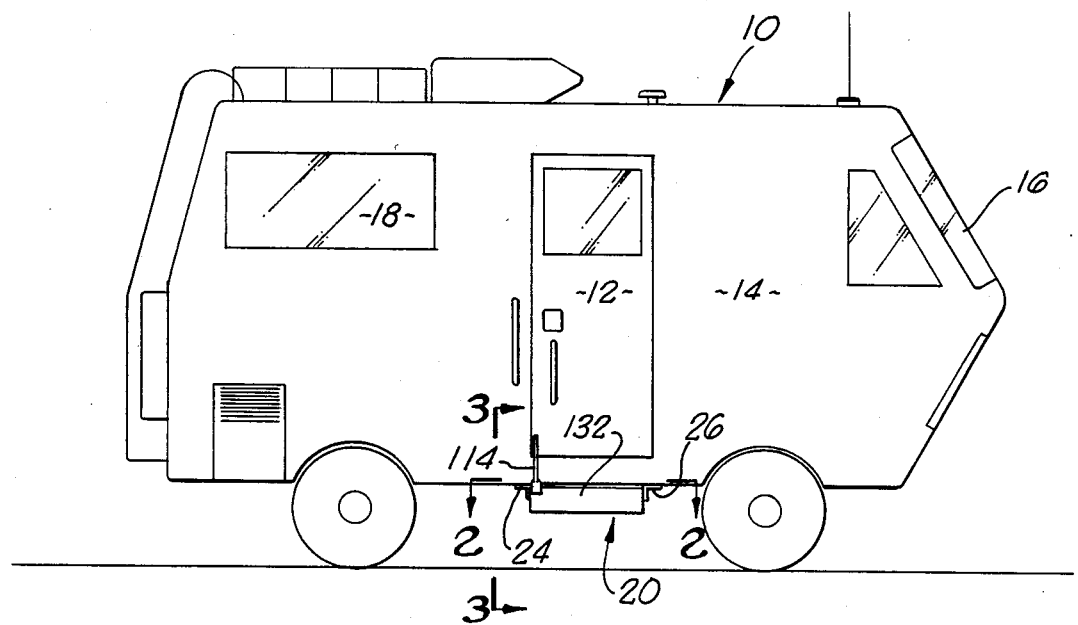
FIG. 1 is an environmental view of the retractable vehicle step affixed to a recreational vehicle.

Now referring specifically to FIG. 1 there is illustrated a conventional vehicle generally designated 10 which in this case is a motor home. The vehicle includes a door 12 mounted in a side wall 14 of the vehicle 10. The vehicle may include a wind shield 16 where the vehicle 10 is capable of self movement and other windows 18. The type of vehicle or equipment thereon is inmaterial to the present invention as long as a door is mounted on the vehicle to gain access to the interior thereof.

Mounted to the under frame 22 (shown in phantom lines) of the vehicle 10 is the retractable vehicle step means generally designated 20. Generally speaking vehicles 10 of the recreational type are fitted on the underframe with a pair of spaced brackets 24 and 26 (shown in phantom lines see FIG. 4) which are welded or otherwise secured to the underframe 22. These brackets receive a rod which is also attached to conventional fold out steps. In order to utilize the retractable vehicle step means 20 of the present invention the conventional steps are removed as well as the rod. The brackets 24 and 26 are then able to be utilized to position the present invention.

In the case of vehicles not equipped with brackets, brackets can be provided and welded or otherwise secured to the underframe 22. The spacing of the brackets will depend on the size of the vehicle 10 and door 12. Usually the brackets are spaced apart 21", 24", or 29".

Turning now to details of the retractable vehicle means there is provided a frame means generally designated 28 which is secured between the brackets 24 and 26 by means of a plurality of bolts and nuts 30 and 32. The frame means 28 includes an upper guide member 34 which is an elongated rectangle. The structure 34 is preferably formed of bar stock with two elongated sides 36 and 38 of the same length and end pieces 40 and 42. The pieces 36,38,40 and 42 are welded or otherwise secured together to form a frame, see FIGS. 2 and 4.

In addition to the upper guide member 34 there is provided a lower guide member 44 of the same dimensions as the upper guide member 34. While the upper and lower guide members 34 and 44 are illustrated as frames it should be appreciated that the members could be solid plates. The purpose of the guide members 34 and 44 are to act as guides for the step 46 and to brace the cantilevered step 46 when weight is placed on it. As can be seen from the drawings the members 34 and 44 are aligned and spaced from each other to accommodate the step 46. The members are united at the end pieces 40 and 42 by plates 48 and 50.

The step 46 is preferably formed by fabricating a bar stock into a rectangular shape similar to the guide members 34 and 44 except that the length of the guide is less that the guide members so that the step may pivot inwardly and outwardly. The frame (shown in dotted lines) is covered with a plate 52. There is also provided an extension of the step 46 to support weight thereon when the same is cantilevered outwardly of the guide members 34 and 44. This extension or weight bearing member 54, best seen in FIGS. 2 and 4 again is a frame which may be formed of tubular stock with sides 56 and 58 joined by end piece 60. The sides and end piece are secured to the frame, unnumbered, of the step 46, the purpose of which will be explained.

In addition to the plate 52 the step 46 may be covered with any type of non-skid material.

Figure 2:
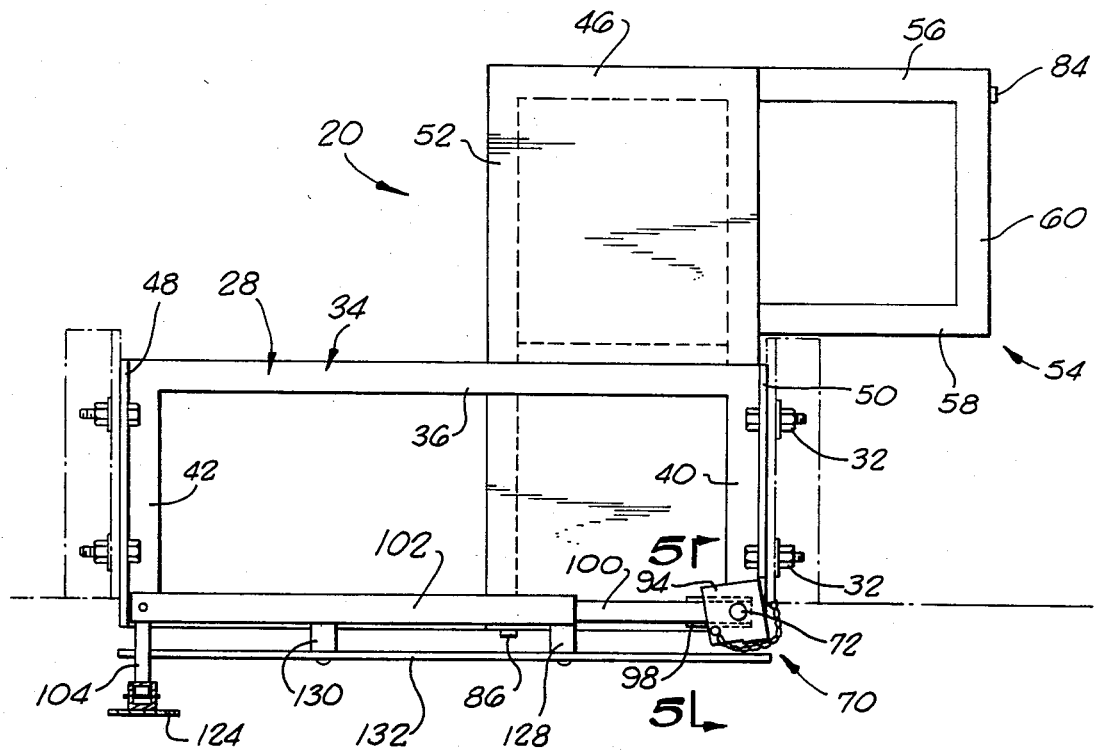
FIG. 2 is a top elevational view of the retractable vehicle step in a closed position as it would be under a vehicle taken on line 2—2 of FIG. 1.

In order to move the step 46 from the inner position as shown in FIG. 2 to the extended or outward position as shown in FIG. 4 there are pivot means generally designated 70 best seen in FIG. 5. There is provided a pivot pin 72 which is of a length to pass through the lower guide member 44, step 46 and upper guide member 34 at a corner thereof. In addition the pin 72 extends above the upper guide member 34 to receive locking means 74 to be described.

The pin 72 is inserted in bore 76 in the lower guide member 44 and is free to rotate therein without rotating the member 44. The pin then passes through the bar stock frame of the step 46 and is secured by welding 78 or other means to the step. The upper guide member 34 is provided with aligned bores 80 and 82 and pin 72 is free to rotate therein without rotating the member 34. There is also provided a bearing washer 82 between the step 46 and lower guide member 44. As can be seen when the pin 72 is rotated the step will rotate with the pin 72 and move inwardly or outwardly for use.

There is also provided a stop means 84 in the form of a downward projecting tab secured to the rear of the step 46 to prevent the same from extending beyond the position of FIG. 4 where the tab engages the rear elongated frame member of the lower guide member 44.

In addition there is provided another stop means 86 secured to the front frame member of the step 46 to prevent the step 46 from extending to far into the guide members as the step is rotated to its retracted position.

In order to rotate the pin 72 and in turn the step 46 there are linkage means 90 which extend between the pivot pin 72 and vehicle door 12 so that as the door 12 is opened or closed the step 46 may be moved between the position of FIGS. 2 and 4.

The linkage means 90 includes a cap means formed of a pair of vertically spaced plates 92 and 94 welded at 96 or otherwise secured to the pivot pin 72 above the upper guide member 34. Freely rotatable on the pivot pin 72 is a piece of bar stock forming a linkage sleeve 98. Mounted within the sleeve 98 and again freely rotatable on the pin 72 is a telescoping bar 100 which slidingly interfits within a fixed sleeve or bar 102.

The fixed bar 102 is secured to the door 12 by means of a link rod 104. In view of the fact that the bottom of the door 12 is higher than the step and also to compensate for misalignment of the parts the link rod 104 is pivotally mounted to assure proper non-binding operation of the step. In order to accomplish this the fixed sleeve 102 is provided with an enlarged opening 106, see FIGS. 8 and 9 through which rod 104 projects from the interior of the bar 102. There is provided a retaining pivotal pin 108 passing through the rod 104. At the other end 110 of the rod 104 pivot tabs 112 and 116 extend outwardly and are seated in an upright door connecting bracket 114, best seen in FIG. 3. The bracket extends vertically and has one or more right angle bends 118 extending toward door 12. In the embodiment shown the ends 120 are internally threaded to receive a bolt or bolts 122 extending through door 12.

In addition a small protector plate 124 may be welded to the exterior of the door connecting bracket 114 if desired.

The fixed sleeve 102 is also fitted on the exterior side 126 with a pair of L brackets 128 and 130 to which is secured a protector plate 132 to not only cover the stop 46, guide members and linkage means but to protect the entire mechanism when the stop is retracted as shown in FIGS. 1 and 2.

As the final part of the assembly there is the locking means 74. FIGS. 4, 5 and 7 best illustrate the means 74. In effect the locking means 74 is used to maintain the door 12 of the vehicle 10 in one of two positions when the step 46 is extended for use. The positions are 90° to the step 46 as shown in FIG. 4 of 180° or fully open as shown in FIGS. 6 and 7. To accomplish this a lock pin 140 is seated in aligned openings, unnumbered of the plates 92 and 94. The openings are adjacent a corner of the plates 92 and 94. The pin 140 is removable and is teethered to the plate 94 by means of cotter pin 142 and chain 144 secured to the upper guide member 34.

In operation when the step 46 is retracted under the vehicle 10 as shown is FIGS. 1 and 2, in order to extend it the the door 12 is opened. As the door 12 is opened from the inside or outside the bracket 114 moves with the door and the link rod 104 will in turn move the fixed bar 102 and telescoping bar 100. The telescoping bar 100 as it pivots will engage the lock pin 140 camming the plates 92 and 94 to pivot. Because the pivot pin 72 is secured to the plates 92 and 94 it in turn will pivot and the step 46 being permanently attached will also pivot outwardly to its fullest extension when the door 11 is at 90° thereto as in FIG. 4.

With the step 46 extended the weight bearing member 54 will still be between the upper and lower guide members 34 and 44 so that downward pressure on the step will allow the extension to engage the lower member 44 and bear there against as well as against the upper member 34 if the weight distribution should be forward of the center of the step 46.

Once the step and door 12 are as shown in FIG. 4 the step will go no further because of stop means 84. However, should it be desirable to fully open the door 12, the pin 140 is removed and the door 12 can rotate freely because the linkage sleeve 98 is free to rotate about pin 72. Once the door 12 is fully opened the pin 140 may be reinserted in plates 92 and 94 and bear against the other side of the sleeve 98.

To cause step 46 to retract under vehicle 10 when the door 12 is approximately at a 180° angle to the step, the pivot pin 40 is placed as shown in FIG. 7 and the door 12 is pivoted to the position shown in FIG. 4. Then the pin 140 is positioned on the other side of the sleeve 98 and rod 100 as shown in FIG. 4. In this position, the step 46 has been retracted and the door 112 may be pivoted and closed as seen in FIG. 2.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A retractable vehicle step assembly particularly suited for recreational vehicles and adapted to be secured to the underframe of said vehicle immediately below an access door to said vehicle, wherein said step can be moved from a retracted position to an extended usable position when said door is open comprising:

a frame means, secured to the underframe of said vehicle below said access door;

a step pivotally mounted on said frame and moveable from a first retracted position under said vehicle to a second extended cantilevered position projecting outwardly of said frame and said step having a rearward extension member integral therewith so that when said step is in said second position said rearward extension member may bear against said frame when weight is placed on said step to reduce the bending moment of said step when entering or leaving said vehicle;

pivot means rotatably mounted in said frame for free rotation therein and permanently affixed to said step so that said pivot means and said step move simultaneously; and linkage means including a horizontal fixed sleeve coupled to said vehicle door, a telescoping bar slidably mounted in said horizontal fixed sleeve extending to and connected to said pivot means, cap means mounted atop said pivot means to direct rotation of said pivot means and said step and a lock pin in said cap means bistable against said telescoping bar to cause said pivot means to rotate with the movement of said fixed sleeve and said telescoping bar whereby movement of said door will be translated to said step to move between said first and second positions.

2. A retractable vehicle step assembly as defined in claim 1 wherein said linking means includes:

an horizontal fixed sleeve coupled to said vehicle door;

a telescoping bar slidably mounted in said horizontal fixed sleeve at one end and mounted for free rotation to said pivot means;

cap means mounted atop said pivot means to direct rotation of said means and said step; and a lock pin in said cap means biasable against said telescoping bar to cause said pivot means to rotate with the rotation of said fixed sleeve and said telescoping bar whereby movement of said door will cause the step to move between said first and second positions.

3. A retractable vehicle step assembly as defined in claim 1 wherein said lock pin may be insertable on either side of said telescoping bar to control the degree of opening of said vehicle door.

4. A retractable vehicle step assembly as defined in claim 1 wherein the linkage means includes:

a link rod between said horizontally fixed sleeve and said vehicle door;

said link rod is pivotally connected to said sleeve and said door whereby pivotal movement of said door and said step will be smooth should there be misalignment between said step and said door.

5. A retractable vehicle step assembly as defined in claim 1 wherein said step includes:

a stop tab on said rearward extension member to engage said frame and prevent movement of said step beyond a proper second cantilevered position thereof.

6. A retractable vehicle step assembly as defined in claim 1 wherein a horizontal protector plate is affixed to said fixed sleeve encompassing said fixed sleeve and said telescoping bar when said step is in said first retracted position.

* * * * *